(12) United States Patent
Kuusela et al.

(10) Patent No.: US 10,547,869 B2
(45) Date of Patent: Jan. 28, 2020

(54) TEMPLATE-BASED ENTROPY CODING OF QUANTIZED TRANSFORM COEFFICIENTS

(71) Applicant: GOOGLE LLC, Mountain View, CA (US)

(72) Inventors: Aki Kuusela, Palo Alto, CA (US); Dake He, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 5 days.

(21) Appl. No.: 15/835,501

(22) Filed: Dec. 8, 2017

(65) Prior Publication Data

US 2019/0182507 A1    Jun. 13, 2019

(51) Int. Cl.
*H04N 19/60* (2014.01)
*H04N 19/18* (2014.01)
*H04N 19/13* (2014.01)
*H04N 19/124* (2014.01)

(52) U.S. Cl.
CPC ............. *H04N 19/60* (2014.11); *H04N 19/13* (2014.11); *H04N 19/18* (2014.11); *H04N 19/124* (2014.11)

(58) Field of Classification Search
CPC ...................................................... H04N 19/60
See application file for complete search history.

(56) References Cited

U.S. PATENT DOCUMENTS

| 6,990,247 | B2 | 1/2006 | Schwartz |
| 7,535,387 | B1 | 5/2009 | Delva |
| 7,573,405 | B2 | 8/2009 | Shima |
| 7,573,407 | B2 | 8/2009 | Reznik |
| 7,982,641 | B1 | 7/2011 | Su et al. |
| 8,004,431 | B2 | 8/2011 | Reznik |
| 2007/0285286 | A1* | 12/2007 | Hussain ............. H03M 7/4006 341/50 |
| 2007/0285287 | A1 | 12/2007 | Hussain et al. |

(Continued)

FOREIGN PATENT DOCUMENTS

| WO | 2011/138584 A1 | 11/2011 |
| WO | 2013/130952 A1 | 9/2013 |

OTHER PUBLICATIONS

International Search Report and Written Opinion in PCT/US2018/051041, dated Jan. 2, 2019, 15 pgs.

(Continued)

*Primary Examiner* — Jeffery A Williams
(74) *Attorney, Agent, or Firm* — Young Basile Hanlon & MacFarlane, P.C.

(57) ABSTRACT

A method of coding a transform block having transform coefficients includes selecting, based on a transform type used for the transform block, a spatial template for a coding context; defining shift registers to each hold one or more stored values regarding the coding context; initializing the shift registers by setting the stored values to default values; and coding values indicative of magnitudes of the transform coefficients from the transform block in a reverse scan order. Coding includes, for each of one or more values, obtaining a value to be coded at a scan position, determining the coding context using the stored values from the shift registers, entropy coding the value to be coded using the coding context, and subsequent to entropy coding the value to be coded, updating at least some of the stored values in the shift registers.

20 Claims, 15 Drawing Sheets

(56) References Cited

U.S. PATENT DOCUMENTS

| | | | |
|---|---|---|---|
| 2008/0111721 A1 | 5/2008 | Reznik | |
| 2008/0162911 A1 | 7/2008 | Vaithianathan | |
| 2008/0240233 A1 | 10/2008 | Au et al. | |
| 2009/0224950 A1 | 9/2009 | Xu | |
| 2011/0137645 A1 | 6/2011 | Vary et al. | |
| 2011/0200104 A1 | 8/2011 | Korodi et al. | |
| 2013/0028334 A1 | 1/2013 | Bossen | |
| 2013/0114730 A1* | 5/2013 | Joshi | H04N 19/70 375/240.18 |
| 2013/0230097 A1* | 9/2013 | Sole Rojals | H04N 19/13 375/240.02 |
| 2014/0286417 A1 | 9/2014 | Gamei et al. | |
| 2016/0212430 A1* | 7/2016 | Ventelae | H04N 19/134 |
| 2016/0286215 A1 | 9/2016 | Gamei et al. | |

OTHER PUBLICATIONS

Hao-Chieh Chang et al., "Efficient algorithms and architectures for MPEG-4 object-based video coding", 2000 IEEE Workshop on Signal Processing Systems (SIPS), Oct. 11-13, 2000 (Piscataway, NJ), pp. 13-22.

Rajan Joshi et al., "AHG19: Modifications to HE transform coefficient coding for transform skip mode", Joint Collaborative Team on Video Coding (VCT-VC) of ITU-T SG16 WP3 and ISO/IEC JTC1/SC29/WG11, 7th Meeting, Geneva, CH, Nov. 21-30, 2011; http://wftp3.itu.int/av-arch/jctvc-site/, Document No. JCTVC-G663 (Nov. 9, 2011), 3 pgs.

T-H Tsai et al., "VLSI design for MPEG-4 shape coding using a contour-based binary motion estimation algorithm", IET Circuits, Devices & Systems, vol. 2, No. 5, Oct. 16, 2008, pp. 429-438.

T. Nguyen et al., "Non-CE11: Proposed Cleanup for Transform Coefficient Coding", Joint Collaborative Team on Video Coding (JCT-VC) of ITU-T SG16 WP3 and ISO/IEC JTC1/SC29/WG11, 8th Meeting, San Jose, CA, Feb. 1-10, 2012, http://wftp3.itu.int/av-arch/jctvc-site/, Document No. JCTVC-H0228 (Jan. 20, 2012), 6 pgs.

Bankoski, et al., "Technical Overview of VP8, An Open Source Video Codec for the Web", Jul. 11, 2011, 6 pp.

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

* cited by examiner

TEMPLATE-BASED ENTROPY CODING OF QUANTIZED TRANSFORM COEFFICIENTS

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

SUMMARY

One aspect of the disclosed implementations is a method of coding a transform block having transform coefficients. The method includes selecting, based on a transform type used for the transform block, a spatial template for a coding context, defining shift registers to each hold one or more stored values regarding the coding context, initializing the shift registers by setting the stored values to default values, and coding values indicative of magnitudes of the transform coefficients from the transform block in a reverse scan order. Coding values indicative of magnitudes of the transform coefficients includes, for each of one or more values, obtaining a value to be coded at a scan position, determining the coding context using the stored values from the shift registers, entropy coding the value to be coded using the coding context, and subsequent to entropy coding the value to be coded, updating at least some of the stored values in the shift registers.

Another aspect of the disclosed implementations is an apparatus for coding a transform block having transform coefficients. The apparatus includes a memory and a processor configured to execute instructions stored in the memory. The instructions, when executed, cause the processor to select, based on a transform type used for the transform block, a spatial template for a coding context, define shift registers to each hold one or more stored values regarding the coding context, and initialize the shift registers by setting the stored values to default values. The instructions further cause the processor to code values indicative of magnitudes of the transform coefficients from the transform block in a reverse scan order. For each of one or more values, the instructions cause the processor to obtain a value to be coded at a scan position, determine the coding context using the stored values from the shift registers, entropy code the value to be coded using the coding context, and subsequent to entropy coding the value to be coded, update at least some of the stored values in the shift registers.

Another aspect of the disclosed implementations is a non-transitory computer-readable storage device including program instructions executable by one or more processors that, when executed, cause the one or more processors to perform operations for coding a transform block having transform coefficients. The operations include selecting, based on a transform type used for the transform block, a spatial template for a coding context, defining shift registers to each hold one or more stored values regarding the coding context, and initializing the shift registers by setting the stored values to default values. The operations further include coding values indicative of magnitudes of the transform coefficients from the transform block in a reverse scan order. For each of one or more values, the operations include obtaining a value to be coded at a scan position, determining the coding context using the stored values from the shift registers, entropy coding the value to be coded using the coding context, and subsequent to entropy coding the value to be coded, updating at least some of the stored values in the shift registers.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings wherein like reference numerals refer to like parts throughout the several views.

FIG. 7 is a diagram illustrating the stages of transform coefficient coding using level maps in accordance with implementations of this disclosure.

DETAILED DESCRIPTION

Figure 1:
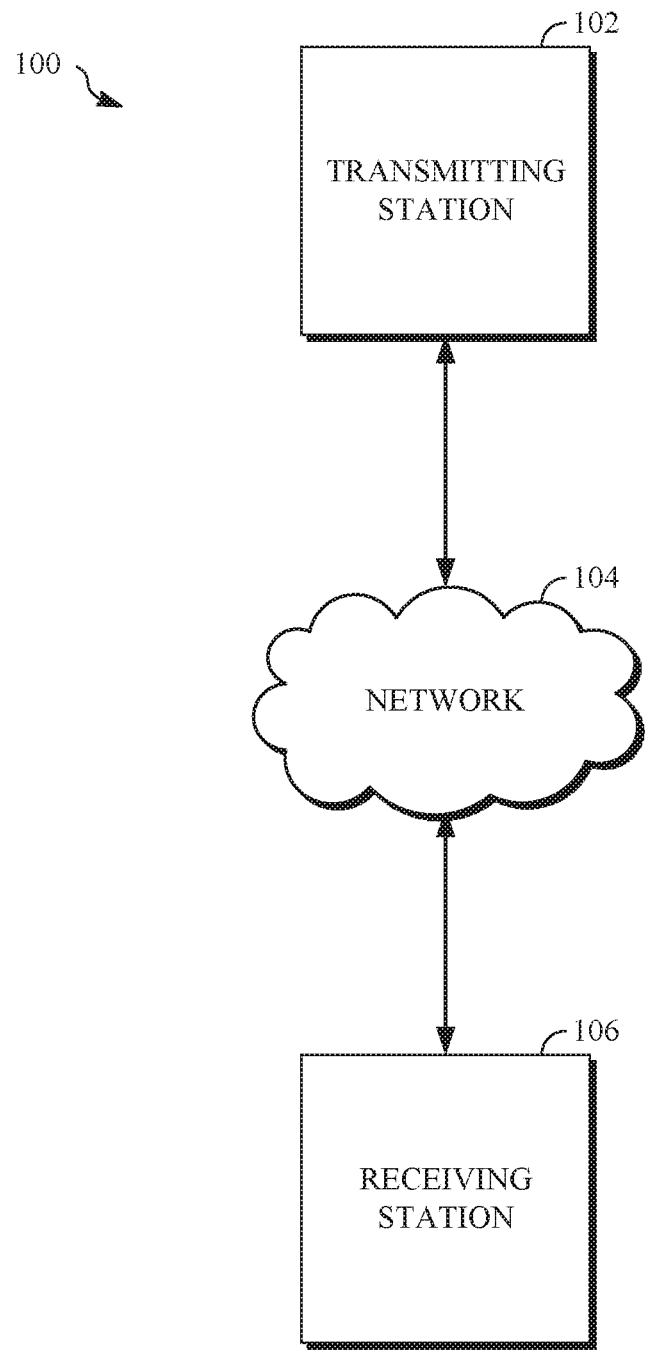
FIG. 1 is a schematic of a video encoding and decoding system.

As mentioned above, compression schemes related to coding video streams may include breaking images into blocks and generating a digital video output bitstream (i.e., an encoded bitstream) using one or more techniques to limit the information included in the output bitstream. A received bitstream can be decoded to re-create the blocks and the source images from the limited information. Encoding a video stream, or a portion thereof, such as a frame or a block, can include using temporal or spatial similarities in the video stream to improve coding efficiency. For example, a current block of a video stream may be encoded based on identifying a difference (residual) between the previously coded pixel values, or between a combination of previously coded pixel values, and those in the current block.

Encoding using spatial similarities can be known as intra prediction. Intra prediction attempts to predict the pixel values of a block of a frame of video using pixels peripheral to the block; that is, using pixels that are in the same frame as the block but that are outside the block. A prediction block resulting from intra prediction is referred to herein as an intra predictor. Intra prediction can be performed along a direction of prediction where each direction can correspond to an intra prediction mode. The intra prediction mode can be signalled by an encoder to a decoder.

Encoding using temporal similarities can be known as inter prediction. Inter prediction attempts to predict the pixel values of a block using a possibly displaced block or blocks from a temporally nearby frame (i.e., reference frame) or frames. A temporally nearby frame is a frame that appears earlier or later in time in the video stream than the frame of the block being encoded. A prediction block resulting from inter prediction is referred to herein as inter predictor.

Inter prediction is performed using a motion vector. A motion vector used to generate a prediction block refers to a frame other than a current frame, i.e., a reference frame. Reference frames can be located before or after the current frame in the sequence of the video stream. Some codecs use up to eight reference frames, which can be stored in a frame buffer. The motion vector can refer to (i.e., use) one of the reference frames of the frame buffer. As such, one or more reference frames can be available for coding a current frame.

As mentioned above, a current block of a video stream may be encoded based on identifying a difference (residual) between the previously coded pixel values and those in the current block. In this way, only the residual and parameters used to generate the residual need be added to the encoded bitstream. The residual may be encoded using a lossy quantization step.

The residual block can be in the pixel domain. The residual block can be transformed into a transform domain, resulting in a transform block of transform coefficients. Herein, the frequency domain is utilized as an example of the transform domain, but should be construed to refer generally to the domain in which the values are expressed after being transformed, including by DCT and its variants, DST and its variants, and identity transform or its scaled variants.

The transform coefficients can be quantized resulting in a quantized transform block of quantized transform coefficients. The quantized coefficients can be entropy encoded and added to an encoded bitstream. A decoder can receive the encoded bitstream, entropy decode the quantized transform coefficients to reconstruct the original video frame.

Entropy coding is a technique for "lossless" coding that relies upon probability models that model the distribution of values occurring in an encoded video bitstream. By using probability models based on a measured or estimated distribution of values, entropy coding can reduce the number of bits required to represent video data close to a theoretical minimum. In practice, the actual reduction in the number of bits required to represent video data can be a function of the accuracy of the probability model, the number of bits over which the coding is performed, and the computational accuracy of fixed-point arithmetic used to perform the coding.

In an encoded video bitstream, many of the bits are used for one of two things: either content prediction (e.g., inter mode/motion vector coding, intra prediction mode coding, etc.) or residual coding (e.g., transform coefficients).

With respect to content prediction, the bits in the bitstream can include, for a block, the intra prediction mode used to encode the block. The intra prediction mode can be coded (encoded by an encoder and decoded by a decoder) using entropy coding. As such, a context is determined for the intra prediction mode and a probability model, corresponding to the context, for coding the intra prediction mode is used for the coding.

Entropy coding a sequence of symbols is typically achieved by using a probability model to determine a probability for the sequence and then using binary arithmetic coding to map the sequence to a binary codeword at the encoder and to decode that sequence from the binary codeword at the decoder.

A context model, as used herein, can be a parameter in entropy coding. A context model can be any parameter or method that affects probability estimation for entropy coding. A purpose of context modeling is to obtain probability distributions for a subsequent entropy coding engine, such as arithmetic coding, Huffman coding, and other variable-length-to-variable-length coding engines. To achieve good compression performance, a large number of contexts may be required. For example, some video coding systems can include hundreds or even thousands of contexts for transform coefficient coding alone. Each context can correspond to a probability distribution.

As already mentioned, residuals for a block of video are transformed into transform blocks of transform coefficients. The transform blocks are in the frequency domain, and one or more transform blocks may be generated for a block of video. The transform coefficients are quantized and entropy coded into an encoded video bitstream. A decoder uses the encoded transform coefficients and the reference frames to reconstruct the block. Entropy coding a transform coefficient involves the selection of a context model (also referred to as probability context model or probability model) which provides estimates of conditional probabilities for coding the binary symbols of a binarized transform coefficient.

In the implementations of template-based entropy coding of quantized transform coefficients that are described herein, spatial templates are used during entropy coding to select context neighbors of the value being coded, and the context neighbors are used to determine the coding context. Accessing the values needed for determining the coding context can, however, lead to memory bottlenecks. In the implementations described herein, the values needed for determining the coding context are held in shift registers, and at least some values from the shift registers are updated using the most recently coded value, which reduces the amount of information that must be obtained from base information such as the transform block or level maps. In some embodiments, these shift registers may be organized into one or more arrays, where the lengths of the one or more arrays may be different.

Template-based entropy coding of quantized transform coefficients is described herein first with reference to a system in which the teachings may be incorporated.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
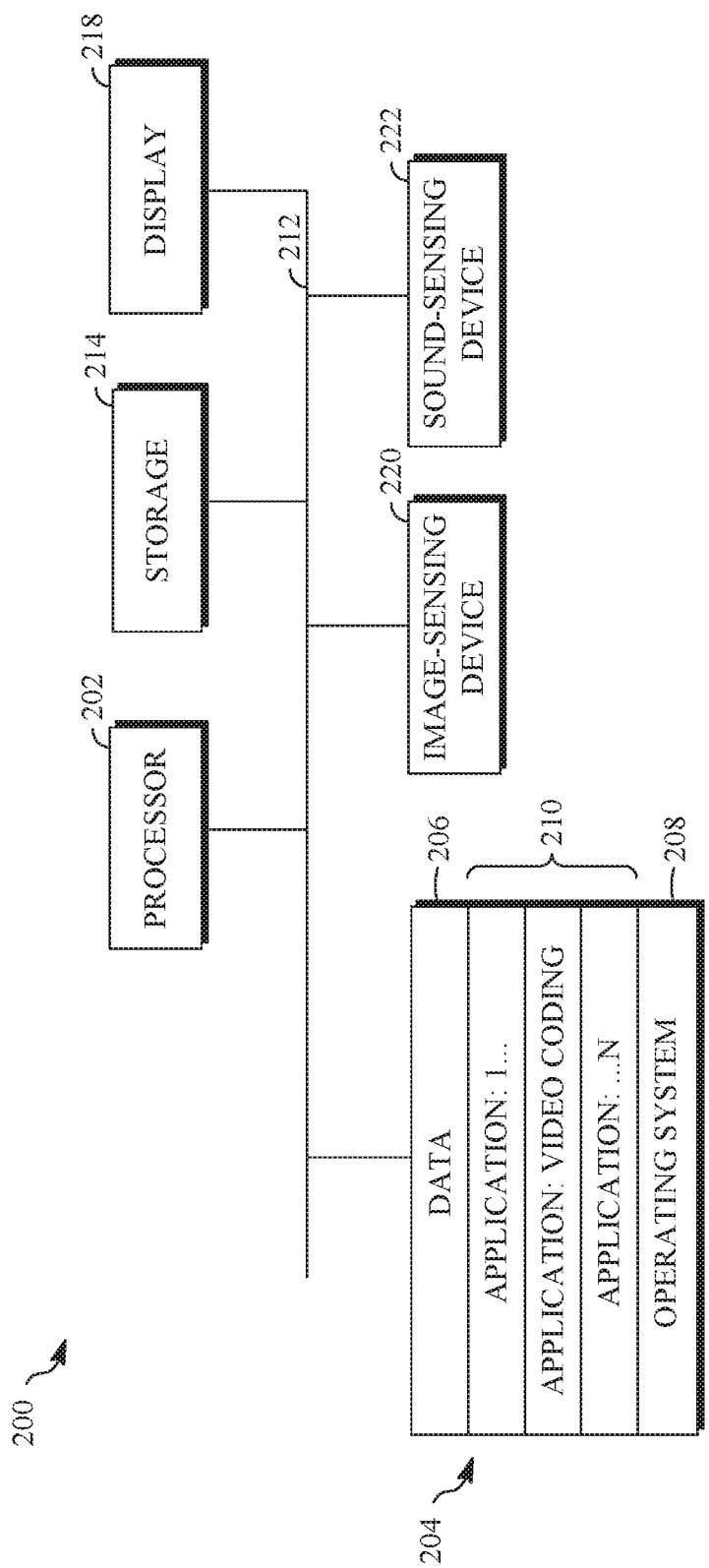
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., an HTTP-based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now-existing or hereafter developed. Although the disclosed implementations can be practiced with a single processor as shown, e.g., the CPU 202, advantages in speed and efficiency can be achieved using more than one processor.

A memory 204 in the computing device 200 can be a read-only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more of processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
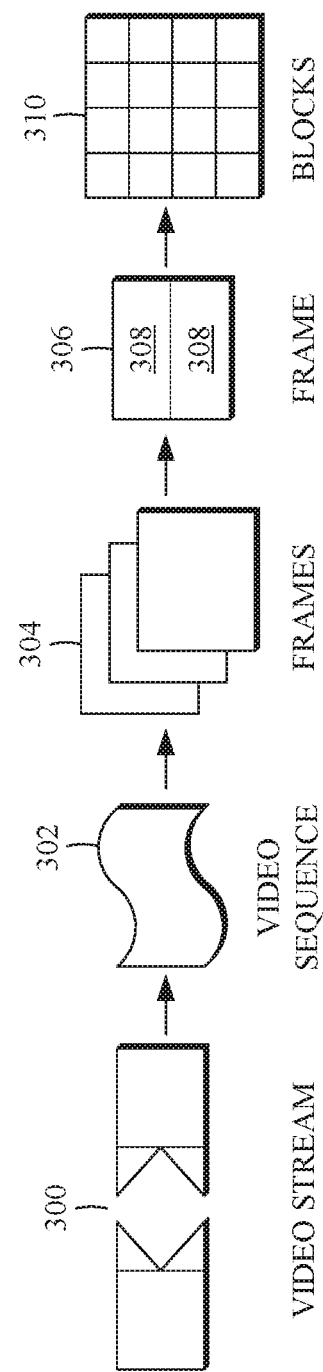
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels or larger.

Figure 4:
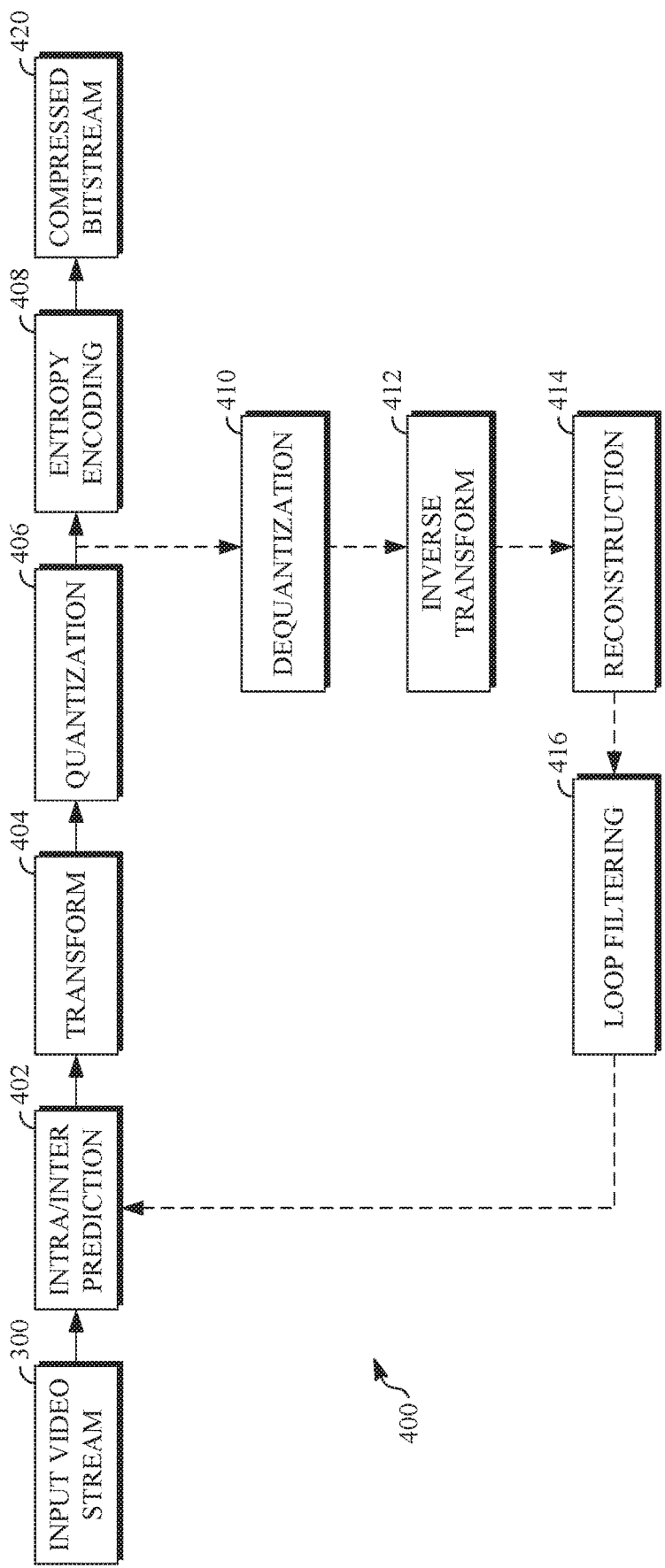
FIG. 4 is a block diagram of an encoder according to implementations of this disclosure.

FIG. 4 is a block diagram of an encoder 400 in accordance with implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in manners described herein. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter prediction stage 402, a block can be encoded using intra-frame prediction (also called intra-prediction) or inter-frame prediction (also called inter-prediction), or a combination of both. In any case, a prediction block can be formed. In the case of intra-prediction, all or a part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. Such block-based transforms include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient is located at the top-left of the matrix and the highest frequency coefficient is located at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block, which may include for example the type of prediction used, transform type, motion vectors and quantizer value, are then output to the compressed bitstream 420. The information to decode the block may be entropy coded into block, frame, slice and/or section headers within the compressed bitstream 420. The compressed bitstream 420 can also be referred to as an encoded video stream or encoded video bitstream, and the terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
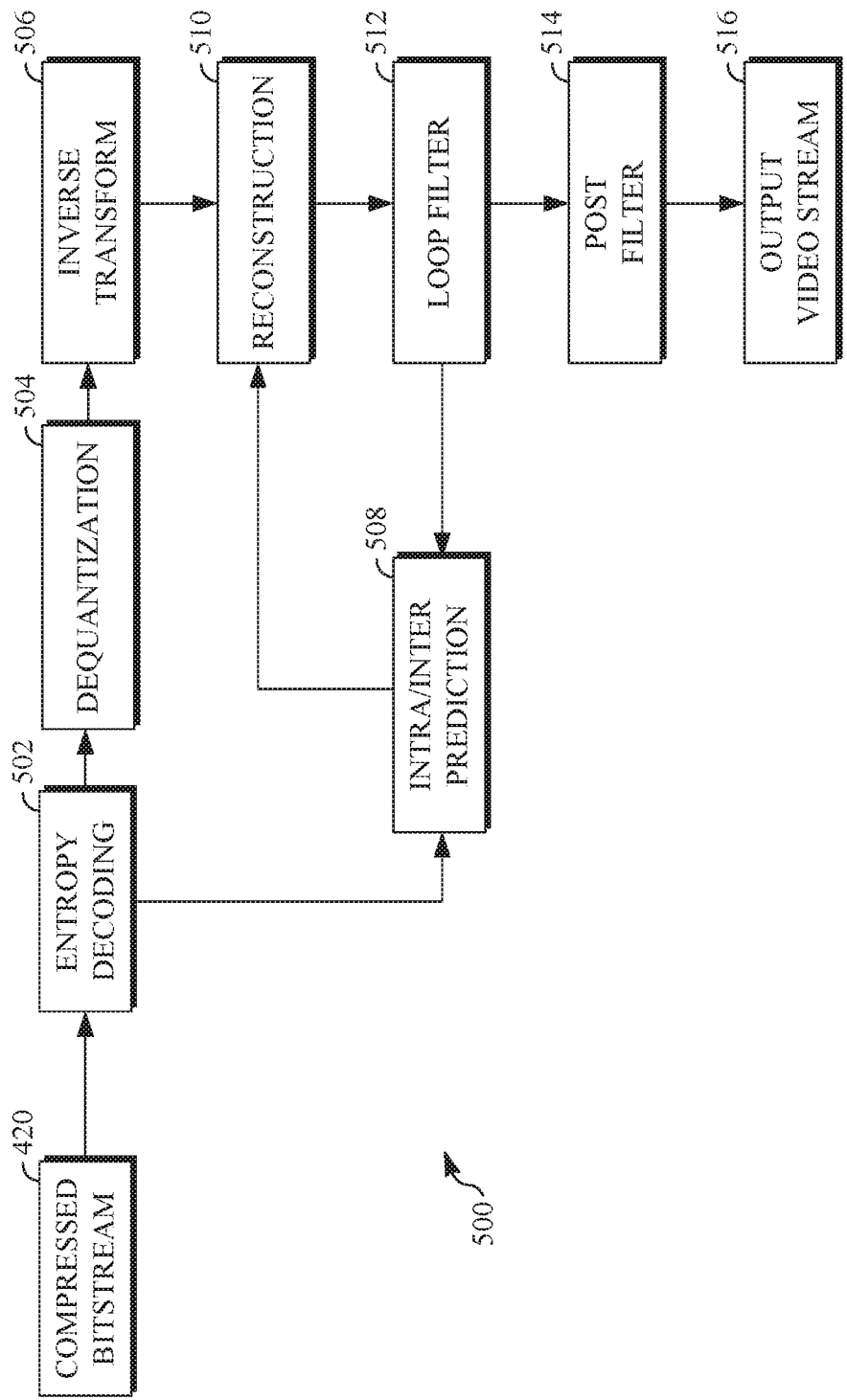
FIG. 5 is a block diagram of a decoder according to implementations of this disclosure.

FIG. 5 is a block diagram of a decoder 500 in accordance with implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manners described below.

The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512 and a post filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In an example, the post filtering stage 514 is applied to the reconstructed block to reduce blocking distortion, and the result is output as an output video stream 516. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the post filtering stage 514. In some implementations of the decoder 500, the post filtering stage 514 is applied before the loop filtering stage 512. Additionally, or alternatively, the encoder 400 includes a deblocking filtering stage in addition to the loop filtering stage 416.

In the encoder 400 and the decoder 500, blocks of transform coefficients may be determined by transforming residual values according to a transform type. Transform types may be one-dimensional transform types, including a one-dimensional horizontal transform type, referred to herein as TX_CLASS_HORIZ, where identity transform is applied to columns, and a one-dimensional vertical transform type, referred to herein as TX_CLASS_VERT, where identity transform is applied to rows. Transform types may be a two-dimensional transform type, referred to herein as TX_CLASS_2D. The selected transform type is used to transform the residual values into the frequency domain during encoding and to inverse-transform from the frequency domain during decoding. As previously described, the transform coefficients are quantized.

The quantized transform coefficients may be represented using level maps and encoded or decoded using context-based arithmetic coding methods. These coding and operations are performed, for example, in the entropy encoding stage 408 of the encoder 400 and the entropy decoding stage 502 of the decoder 500. Context-based arithmetic coding methods code values using a probability model that is selected based on a coding context or simply a context. The coding context includes values that are within a spatial area near the value being coded. Selecting the probability model based on the coding context allows for better modelling of probabilities given that a high level of correlation between coding modes is typically present in a given spatial area. When coding a transform value from a block, the context is determined based on a template. The template is selected based on the transform type.

In level map coding, the transform block is decomposed into multiple level maps such that the level maps break down (i.e., reduce) the coding of each transform coefficient value into a series of binary decisions each corresponding to a magnitude level (i.e., a map level). The decomposition can be done by using a multi-run process. As such, a transform coefficient of the transform block is decomposed into a series of level maps, which may be level binaries, and a residue according to the equation:

$$\text{coefficient}[r][c] = \left\{ \left( \sum_{k=0}^{T} \text{level}_k[r][c] \right) + \text{residue}[r][c] \right\} * \text{sign}[r][c]$$

Where $$\text{residue}[r][c] = \text{absolute}(\text{coefficient}[r][c]) - T - 1$$

$$\text{sign}[r][c] = \begin{cases} 1 & \text{if coefficient}[r][c] > 0 \\ -1 & \text{if coefficient}[r][c] < 0 \end{cases}$$

In the above equation, coefficient[r][c] is the transform coefficient of the transform block at the position (row=r, column=c), T is the maximum map level, levelk is the level map corresponding to map level k, residue is a coefficient residual map, and sign is the sign map of the transform coefficients. The transform coefficients of a transform block can be re-composed using the same equation, such as by a decoder, from encoded levelk maps, residual map residue, and sign map sign. Level map coding will be explained further with reference to FIGS. 6-7.

Figure 6:
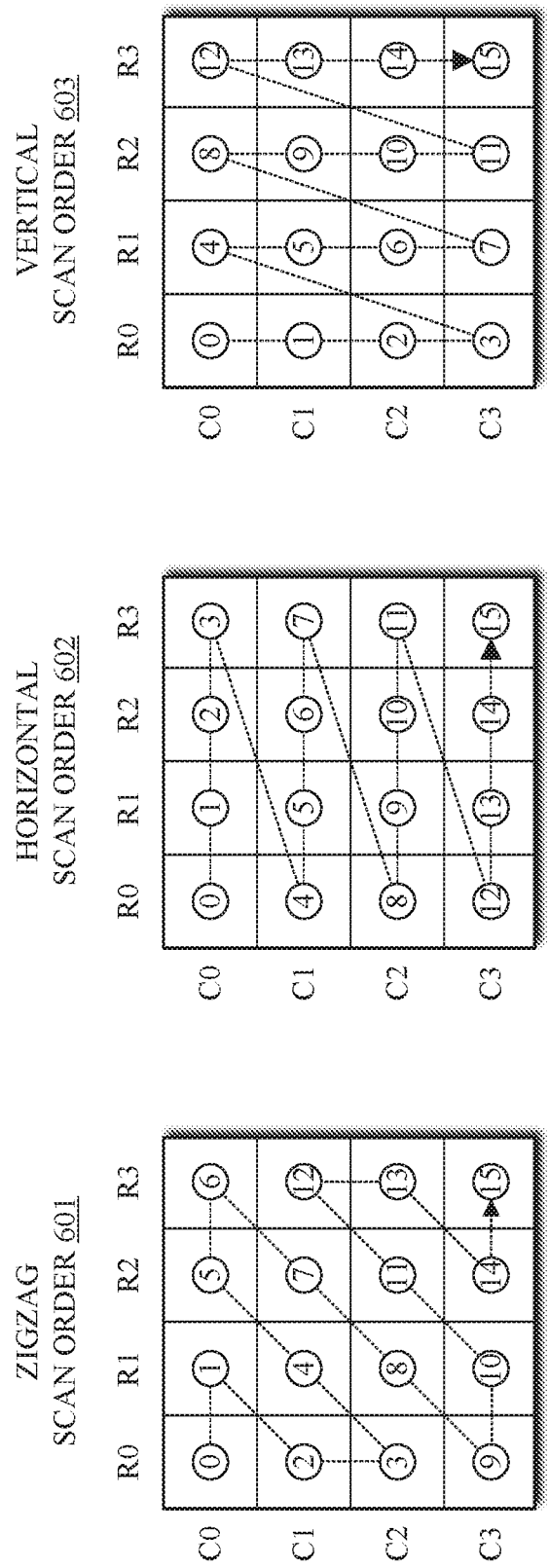
FIG. 6 is a diagram showing scan orders that can be utilized when coding a block of transform coefficients in accordance with implementations of this disclosure.

FIG. 6 is a diagram showing scan orders that can be utilized when coding a block of transform coefficients in accordance with implementations of this disclosure. The scan orders include a zig-zag scan order 601, a horizontal scan order 602, and a vertical scan order 603. In the illustrated example the blocks are 4×4 blocks that each include 16 values. Each has four rows, labelled R0-R3 in left-to-right order, and four columns, labelled C0-C3 in top-to-bottom order. Individual locations in each block correspond to individual transform coefficients, and can be addressed in the format [r, c], where r represents the row number and c represents the column number. Each of the zig-zag scan order 601, the horizontal scan order 602, and the vertical scan order 603 starts at position [0, 0], and the numbers shown indicate the order in which locations in the block are visited subsequent to position [0, 0], according to the scan order. The zig-zag scan order 601 visits locations in the block along diagonals, proceeding in a left-to-right and top-to-bottom manner. The horizontal scan order 602 proceeds left-to-right along each row before proceeding to the next row in top-to-bottom order. The vertical scan order 603 proceeds top-to-bottom along each column before proceeding to the next column in left-to-right order.

Figure 7:
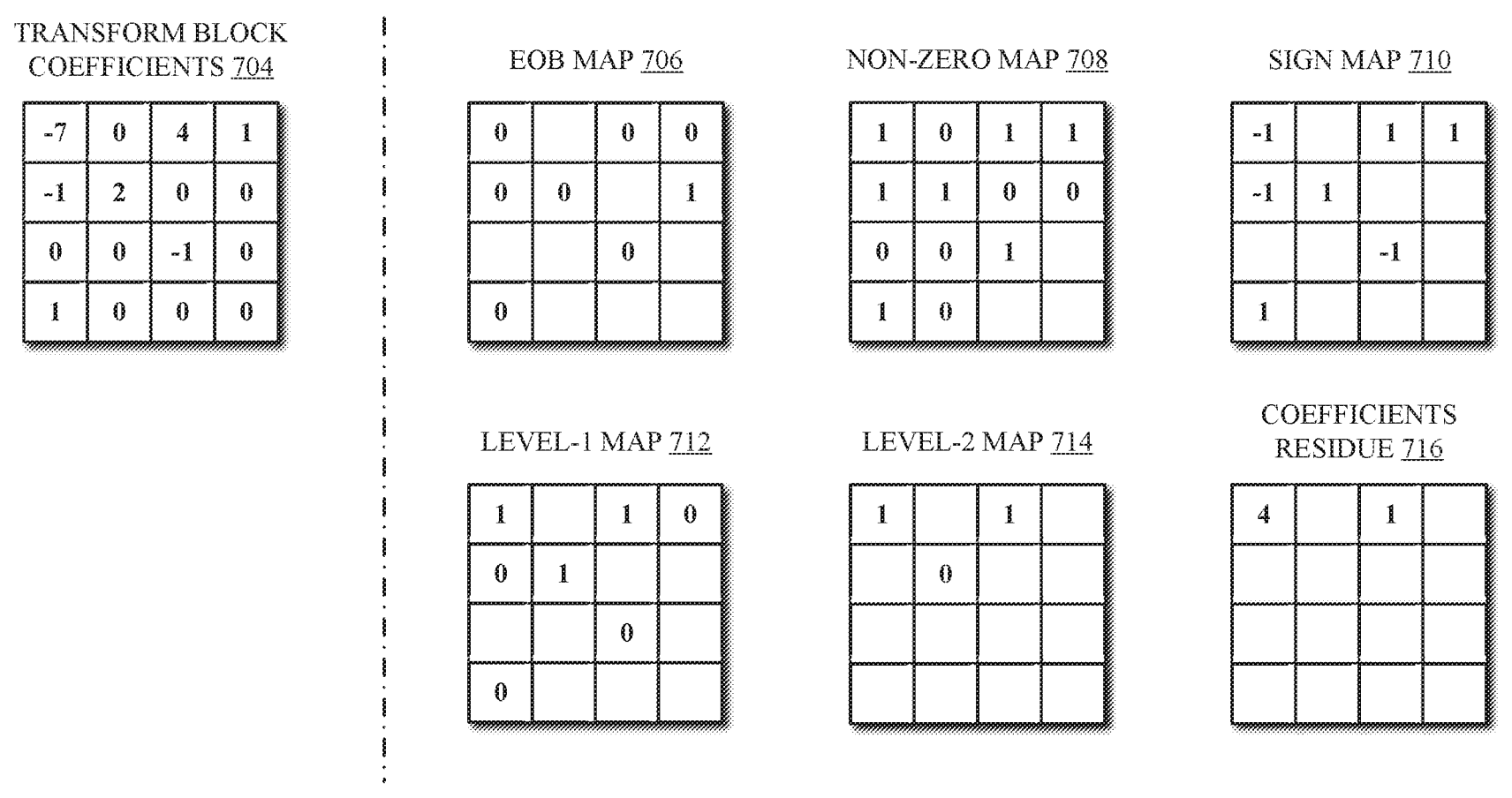

FIG. 7 is a diagram illustrating the stages of transform coefficient coding using level maps in accordance with implementations of this disclosure. FIG. 7 shows a transform block 704 and level maps that represent the transform block, including an end-of-block map 706, a non-zero map 708, a sign map 710, a level-1 map 712, a level-2 map 714, and a coefficient residual map 716.

The transform block 704 is an example of a block of transform coefficients that can be received from the quantization step of an encoder, such as the quantization stage 406 of the encoder 400 of FIG. 4. The transform block 704 includes zero and non-zero transform coefficients. Some of the non-zero coefficients may be negative values.

The end-of-block map 706 indicates the end-of-block position for the transform block 704. The end-of-block position is the position at which there are no further non-zero values in the transform block 704, as determined when the transform coefficient positions are visited in the scan order being used. Thus, at and after the end-of-block position, all values are from the transform block 704 are zero. In the illustrated example, the zig-zag scan order 601 is used, non-zero coefficients that are other than the end-of-block position are indicated with a value of zero, and the end-of-block position is indicated with a value of one (1). In the illustrated example, the end-of-block is located at position [2, 2] as indicated by the value one (1) at that position, with preceding non-zero values indicated by the value zero.

The non-zero map 708 is a level map that indicates, for each position in the transform block 704, whether the corresponding transform coefficient is equal to zero or is a non-zero value. In the illustrated example, the non-zero map 708 includes a zero at the location of each transform coefficient that has a zero value and is located prior to the end-of-block position, and the non-zero map 708 includes the value one (1) at all locations that have a non-zero value in the transform block 704. The non-zero map 708 may also be referred to as a level-zero map.

The sign map 710 indicates, for each position of the transform block 704 that has a non-zero value, whether the corresponding transform coefficient has a positive value or a negative value. In the illustrated example, the value −1 indicates that the corresponding transform coefficient has a negative value, and the value one indicates that the corresponding transform coefficient has a positive value. Other symbols can be utilized, such as zero and one.

The non-zero map 708, the level-1 map 712, the level-2 map 714, and the coefficient residual map 716, in combination, define the absolute value for the transform coefficients from the transform block 704. Of these, the non-zero map 708, the level-1 map 712, the level-2 map indicate, using only binary values, whether the corresponding transform coefficients from the transform block 704 have an absolute value that is equal to zero, one, or two, or is greater than or equal to three. For each non-zero value, as indicated by the non-zero map 708, the level-1 map 712 includes the value zero if the absolute value of the corresponding transform coefficient is equal to one, or includes the value one if the absolute value of the transform coefficient is greater than or equal to two. For each value indicated as greater than or equal to two in the level-1 map 712, the level-2 map 714 includes the value zero if the absolute value of the corresponding transform coefficient is equal to two, or includes the value one if the absolute value of the transform coefficient is greater than or equal to three.

In one alternative example, a single level map can replace the non-zero map 708, the level-1 map 712, and the level-2 map, by using a two bit value to indicate, for each transform coefficient from the transform block 704, whether the absolute value of the transform coefficient is equal to zero, one, or two, or is greater than or equal to three. In another alternative example, a different number of level maps can be used, in which case the threshold at which a residual value is present will change.

In the illustrated example, the coefficient residual map 716 includes the residue for each transform coefficient from the transform block 704. The residue for each transform coefficient from the transform block 704 is the magnitude of the transform coefficient in excess of the representation of it in the level maps. In this example, residue for each transform coefficient from the transform block 704 is calculated as the absolute value of the transform coefficient from the transform block 704 minus three.

Figure 8:
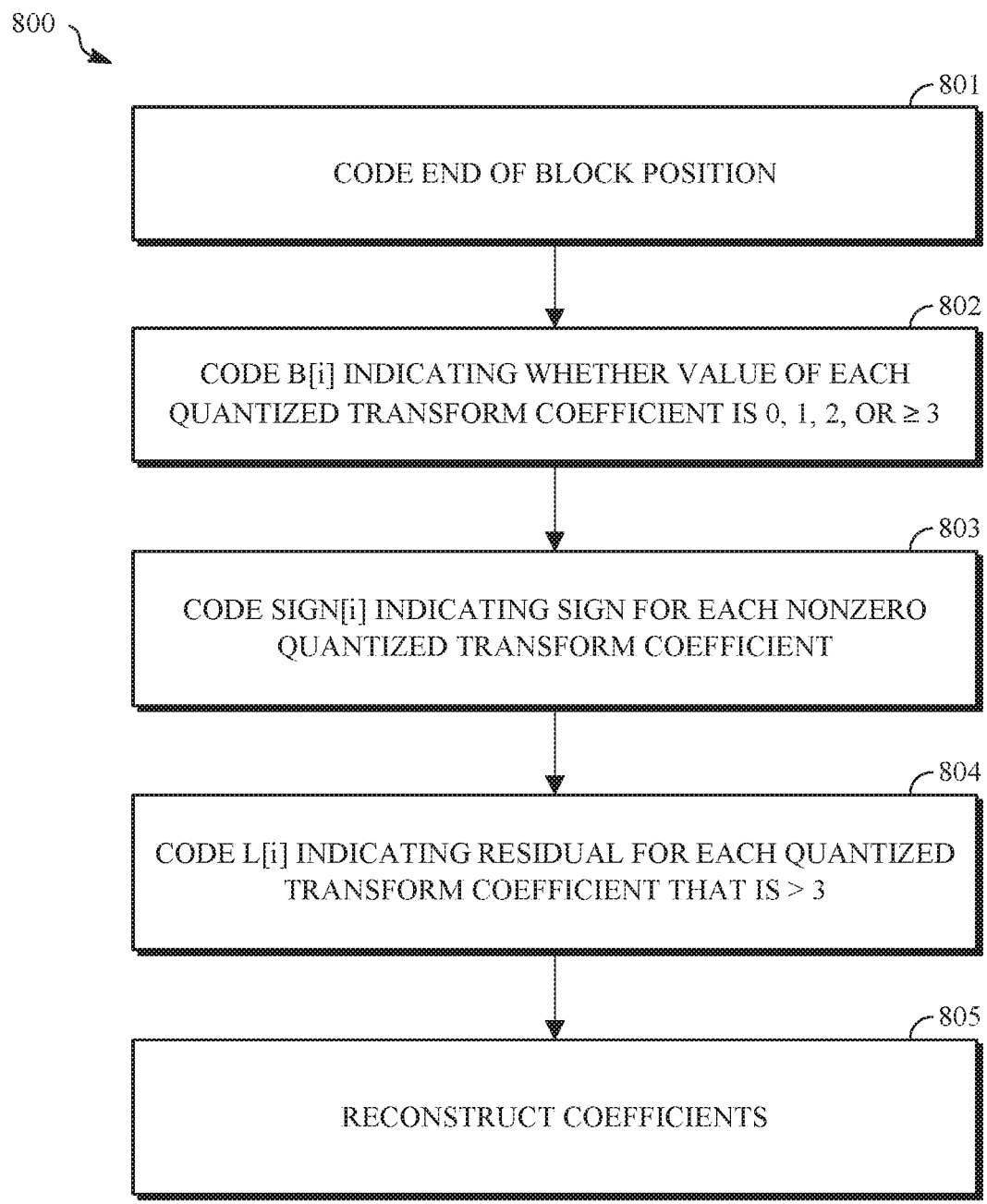
FIG. 8 is a flowchart diagram of a process for encoding a transform block in an encoded video bitstream using level maps according to an implementation of this disclosure.

FIG. 8 is a flowchart diagram of a process 800 for encoding a transform block in an encoded video bitstream using level maps according to an implementation of this disclosure. The process 800 can be implemented in an encoder such as the encoder 400. The encoded video bitstream can be the compressed bitstream 420 of FIG. 4.

The process 800 can be implemented, for example, as a software program that can be executed by computing devices such as transmitting station 102. The software program can include machine-readable instructions that can be stored in a memory such as the memory 204 or the secondary storage 214, and that can be executed by a processor, such as CPU 202, to cause the computing device to perform the process 800. In at least some implementations, the process 800 can be performed in whole or in part by the entropy encoding stage 408 of the encoder 400.

The process 800 can be implemented using specialized hardware or firmware. Some computing devices can have multiple memories, multiple processors, or both. The steps or operations of the process 800 can be distributed using different processors, memories, or both. Use of the terms "processor" or "memory" in the singular encompasses computing devices that have one processor or one memory as well as devices that have multiple processors or multiple memories that can be used in the performance of some or all of the recited steps.

The process 800 can receive a transform block, such as the transform block 704 of FIG. 7. The transform block 704 can be received as the output from the quantization step of an encoder, such as the quantization stage 406 of the encoder 400 of FIG. 4. The transform block 704 includes zero and non-zero transform coefficients. Some of the non-zero coefficients may be negative values.

In operation 801, the end-of-block position (EOB) is encoded by generating and including values in the encoded video bitstream that indicate the end-of-block position. In an implementation of the process 800, operation 802 can include generating an end-of-block map for the transform block, as explained with respect to the end-of-block map 706.

In operation 802, a value B[i] is coded to indicate the value of the transform coefficient less the residual, if any, where i denotes the scan position (i=0 corresponds to the top-left position, which is commonly referred to as the DC position), and B[i] denotes whether the magnitude of the quantized coefficient at scan position i is 0, 1, 2, or ≥3. The value B[i] is coded for each position in the scan order in reverse order from the position prior to the end-of-block position (i=EOB−1) to the DC position (i=0). In some implementations, the value B[i] is coded in operation 802 using level maps, such as the non-zero map 708, the level-1 map 712, and the level-2 map 714.

The value B[i] is coded into the video bitstream in operation 802 using context-based arithmetic coding methods. Context-based arithmetic coding methods utilize a context model, which can be determined based on the binary values of any number of previously coded neighbors, and can fully utilize information from all these neighbors. The previously coded neighbors can be neighbors in the same level map or a preceding level map, such as an immediately preceding level map. For example, the level-1 map 712 can provide context information for coding the level-2 map 714.

In some implementations of the process 800, operation 801 and operation 802 are combined by interleaving the end-of-block map 706 into the non-zero map 708.

In operation 803, a value is coded for each non-zero quantized transform coefficient indicating whether the sign of the quantized transform coefficient is positive or negative. This value may be referred to as Sign[i], where i denotes the scan position and Sign[i] denotes the sign of the non-zero coefficient at scan position i. Operation 803 may be performed using the sign map 710.

In operation 804, a residual value, referred to as L[i], is coded for all transform coefficients that have a value greater than what is represented by the value B[i], which is the present example represents quantized transform coefficients having an absolute value of 0, 1, and 2 without use of a residual value. Thus, in this example, for each quantized transform coefficient having an absolute value greater than two, the value L[i] denotes the magnitude of the quantization coefficient at scan position i, and is equal to the value of the quantized transform coefficient for scan position i minus three.

The residual values L[i] can be encoded in the encoded video bitstream using binary coding or multi-symbol coding. A probability distribution that fits the statistics of the residual coefficients of the coefficients residue map can be used. The probability distribution can be a geometric distribution, a Laplacian distribution, a Pareto distribution, or any other distribution.

In operation 805, the quantized transform coefficients are reconstructed using the coded values to verify the encoding.

Figure 9:
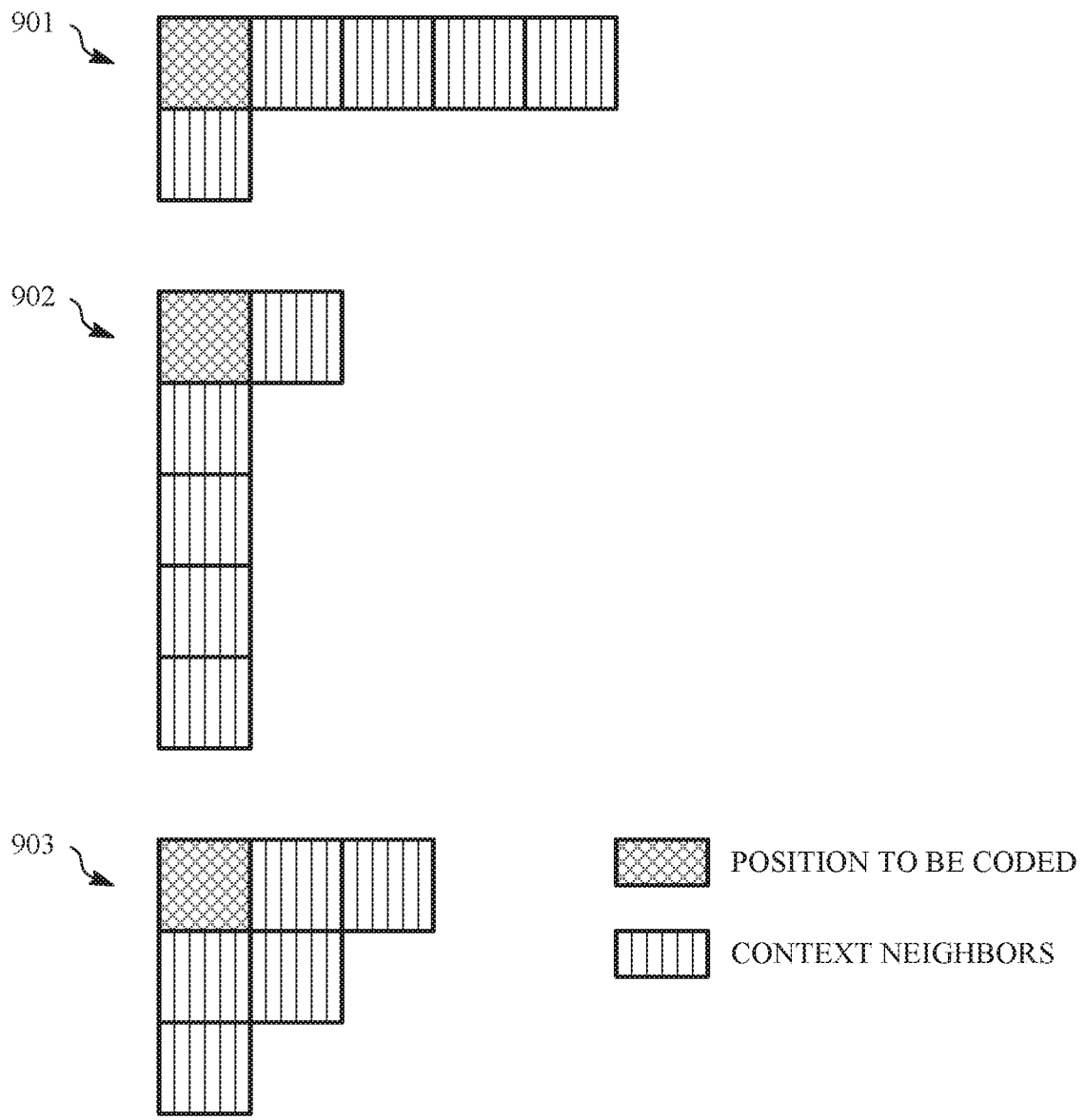
FIG. 9 is a diagram showing spatial neighboring templates that can be utilized in context-based arithmetic coding methods in accordance with implementations of this disclosure.

In the process 800, spatial neighboring templates can be utilized for determining context models used in context-based arithmetic coding methods. For example, in operation 802, the context used to code the value B[i] is derived by using a spatial template anchored to the block position (r_i, c_i) corresponding to the scan position i, where r_i denotes the row index and c_i denotes the column index. FIG. 9 is a diagram showing examples of spatial neighboring templates can be utilized in context-based arithmetic coding methods in accordance with implementations of this disclosure. A horizontal template 901 includes multiple context neighbors that are in the same row as a position to be coded, and one context neighbor in the same column as the position to be coded. In the illustrated example, the horizontal template 901 includes four context neighbors to the right of the position to be coded and one context neighbor below the position to be coded. A vertical template 902 includes one context neighbor that is in the same row as the position to be coded, and multiple context neighbors in the same column as the position to be coded. In the illustrated example, the vertical template 902 includes one context neighbor to the right of the position to be coded and four context neighbors below the position to be coded. A two-dimensional template 903 includes context neighbors in a triangular pattern that is anchored at the position to be coded. In the illustrated example, the vertical template 902 includes two context neighbors to the right of the position to be coded, two context neighbors below the position to be coded, and one context neighbor that is located diagonally downward and rightward relative to the position to be coded.

The spatial neighboring template that is used in a specific coding operation may be selected based on the transform type used to determine the quantized transform coefficients. For example, if the transform type is a horizontal transform type, such as TX_CLASS_HORIZ, the horizontal template 901 is used. If the transform type is a vertical transform type, such as TX_CLASS_VERT, the vertical template 902 is used. If the transform type is a two-dimensional transform type, such as TX_CLASS_2D, the two-dimensional template 903 is used.

During context-based coding, obtaining the values to be used in the selected template as context neighbors may become costly in a naive implementation, such as one that obtains the needed values by a table lookup, and can result in performance issues, such as memory bottlenecks. Performance issues may be more common, for example, when the block size is large (e.g., a 32×32 transform block, which has 1024 positions).

According to implementations of this disclosure, performance can be improved by storing needed information in shift registers. To allow use of shift registers for this purpose, the scan orders used for coding of transform coefficients, such as the zig-zag scan order 601, the horizontal scan order 602, and the vertical scan order 603, share common properties in that the coefficients in a row are always be visited from left to right and coefficients in a column will always be visited from top to bottom in the scan order. Stated another way, given a scan order S, let iS[r, c] denote the scan position for a valid block position [r, c], where r denotes the row index and c denotes the column index in a transform block. Then $iS[r, c] < iS[r', c]$ for any $r'>r$ and $iS[r, c] < iS[r, c']$ for any $c'>c$. Thus, during coding of level maps, which are coded in reverse scan order, the context neighbors needed for coding a current value to be coded have already been visited.

Figure 10:
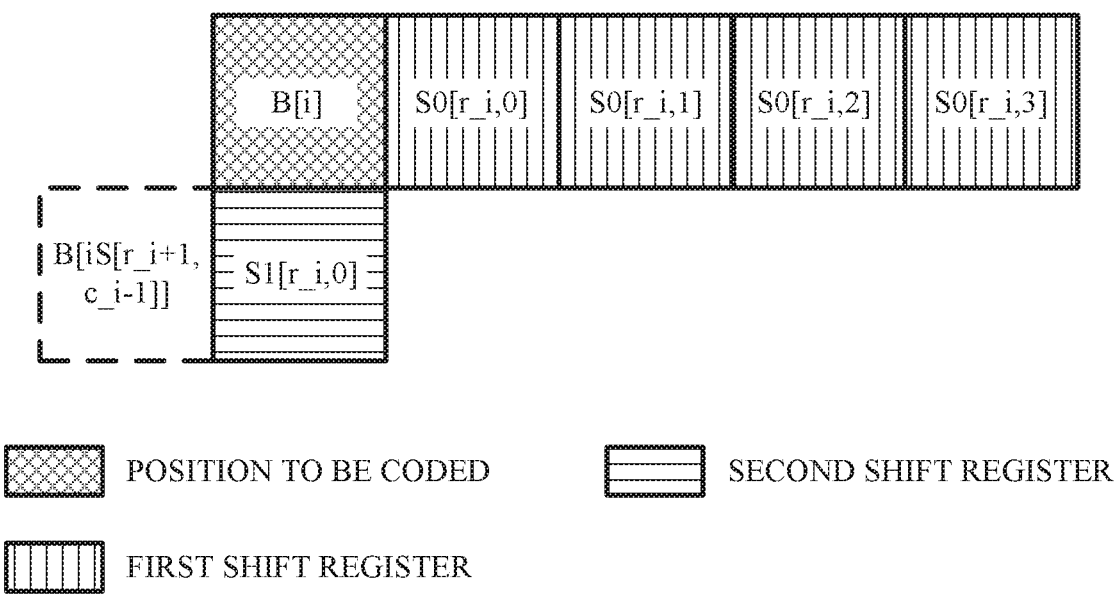
FIG. 10 is a diagram that shows a first example of a register set that correspond to a horizontal template.
Figure 11:
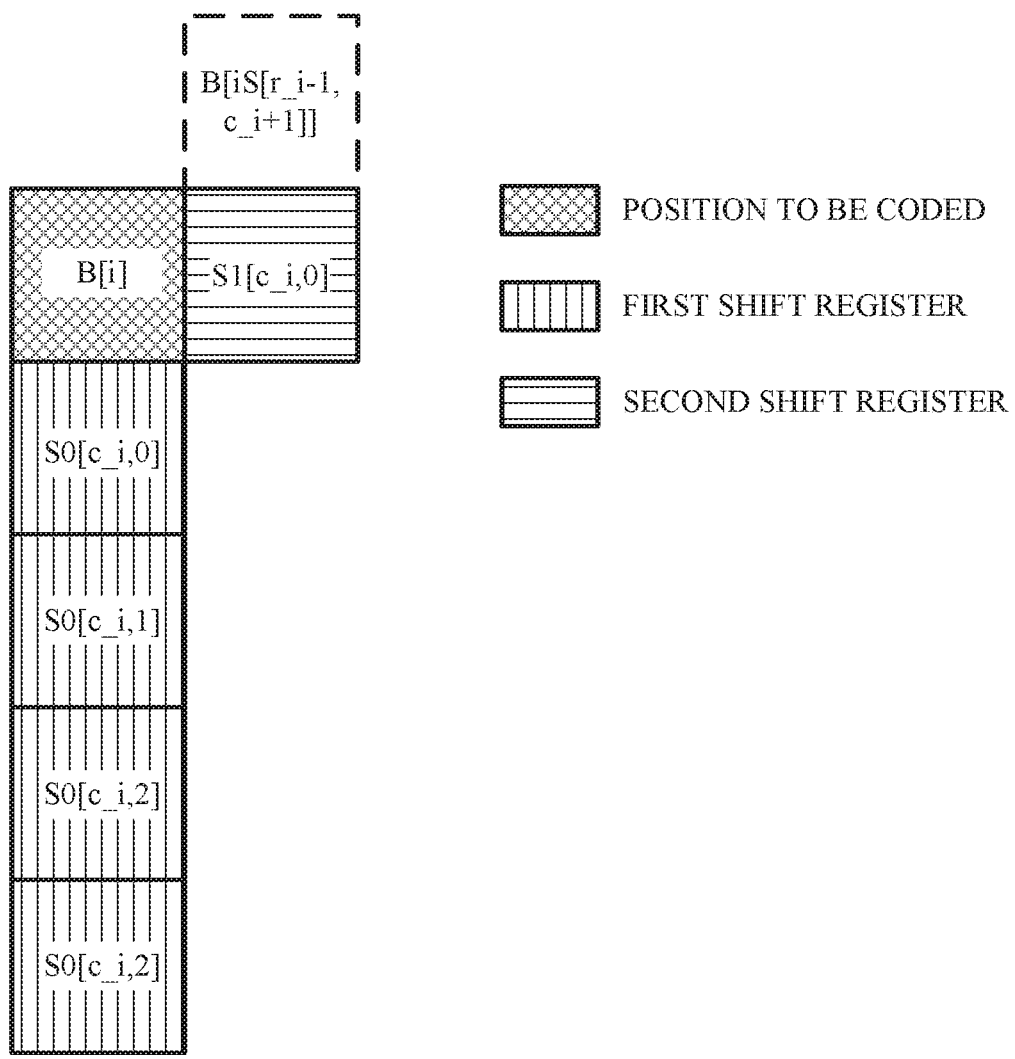
FIG. 11 is a diagram that shows a first example of a register set that corresponds to a vertical template.
Figure 12:
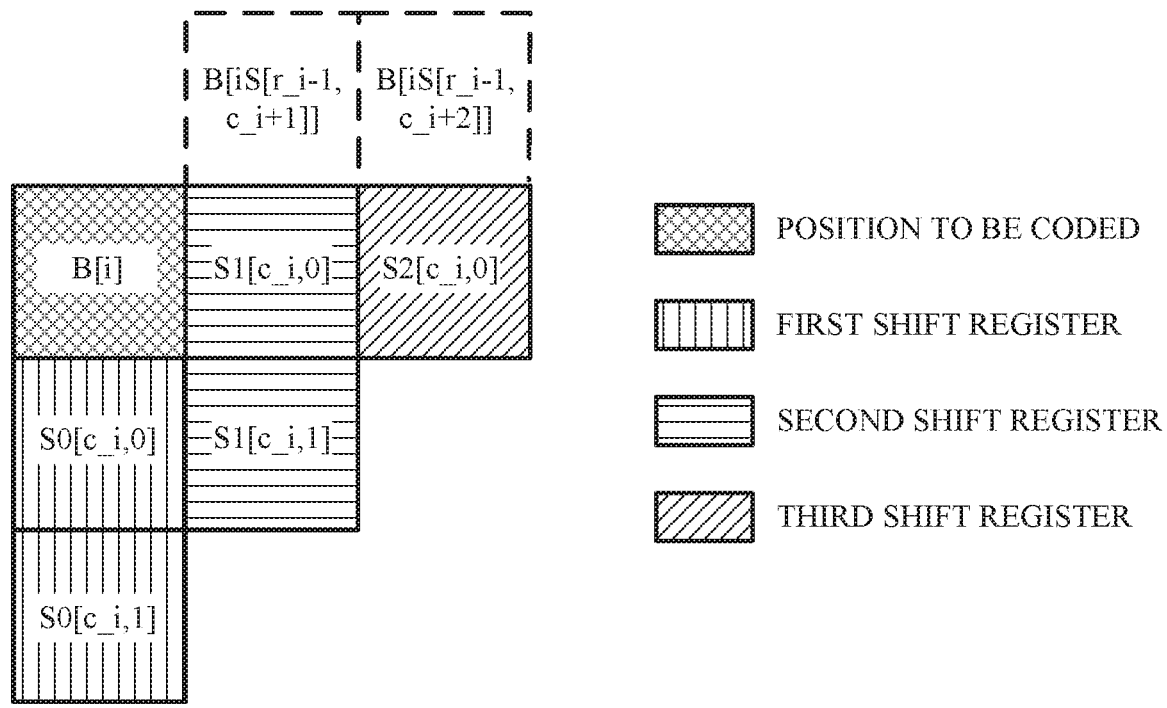
FIG. 12 is a diagram that shows a first example of a register set that corresponds to a two-dimensional template.

In the implementations that will be described herein, information needed for context derivation is stored sets of shift registers, for example, in two or three sets of shift registers, as shown in FIGS. 10-12. FIG. 10 is a diagram that shows a first example of a register set that corresponds to a horizontal template. FIG. 11 is a diagram that shows a first example of a register set that corresponds to a vertical template. FIG. 12 is a diagram that shows a first example of a register set that corresponds to a two-dimensional template.

By using shift registers, context information for all positions of the transform block need not be held in memory. The shift registers implement template-based coding by holding values for locations in the template being used, such as the horizontal template 901, the vertical template 902, and the two-dimensional template 903. Thus, the shift registers can correspond to the size and shape of the template being used, with each shift register value corresponding to a particular spatial location in the template. For example, multiple shift registers can be included in a register set to represent the shape and size to the template being used. In some implementations, the shift registers include at least a first shift register that has a first size and a second shift register that has a second size that is different than the first size.

The values in the shift registers are initially set to zero. Whenever a position [r, c] is out of block boundary, a default value, such as 0, is used at the position. Once a symbol is coded (encoded or decoded), the registers are updated for use in coding the next symbol, using the value of the position that was coded and/or base information obtained from the level maps.

For a transform of size M×N in TX_CLASS_HORIZ, the number of register sets is equal to the number of rows N. In this implementation, each register set includes one 8-bit register and one 2-bit register, which hold values corresponding to the horizontal template 901 on a per-row basis. Each register set is used for coding a particular row of the transform block. For a transform of size M×N in TX_CLASS_VERT, the number of register sets is equal to the number of columns M. In this implementation, each register set includes one 8-bit register and one 2-bit register, which hold values corresponding to the vertical template 902 on a per-column basis. Each register set is used for coding a particular column of the transform block. For a transform of size M×N in TX_CLASS_2D, the number of register sets is equal to the lower of the number of columns M and the number of rows N. In this implementation, each register set includes two 4-bit registers and one 2-bit register, which hold values corresponding to the two-dimensional template 903. Thus, context neighbor values are stored in the register set for the context neighbors defined by the shape of the two-dimensional template 903, on either of a per-column or per-row basis (dependent on the smaller dimension of the transform), and each register set is used for coding a particular column or row of the transform block. The registers described above all stored values using 2-bit precision (e.g., an 8-bit register stores four 2-bit values and a 2-bit register stores one 2-bit value). It should be understood, however, that values of differing precisions could be utilized. It should further be understood that the number of values held in each register can be changed according to the geometry of a particular spatial template.

For coding a transform block determined using TX_CLASS_HORIZ using a context corresponding to the horizontal template 901, there are N register sets, corresponding to rows r=0 through N−1. FIG. 10 is a diagram that shows an example of register sets that correspond to the horizontal template 901. Each register set includes two registers, including a first register S0 and a second register S1, which are defined as:

S0[r, 0], S0[r, 1], S0[r, 2], S0[r, 3],
S1[r, 0].

As shown in FIG. 10, register S0 includes values for the same row and to the right of the position being coded B[i], and register S1 includes a single value in the same column and one row below the position being coded B[i]. In some implementations, S0 and S1 may be organized into two arrays of shift registers, where each register in the first array has size 4 and each register in the second array has size 1.

For coding a transform block determined using TX_CLASS_VERT using a context corresponding to the vertical template 902, there are M register sets, corresponding to columns c=0 through M−1. FIG. 11 is a diagram that shows an example of register sets that correspond to the vertical template 902. Each register set includes two registers, including a first register S0 and a second register S1, which are defined as:

S0[c, 0], S0[c, 1], S0[c, 2], S0[c, 3],
S1[c, 0].

As shown in FIG. 11, register S0 includes values for the same column and below the position being coded B[i], and register S1 includes a single value in the same row and one row to the right of the position being coded B[i].

For coding a transform block determined using TX_CLASS_2D, with reference to an example in which the transform block has fewer columns M than rows N (i.e., M<N), and using a context corresponding to the two-dimensional template 903, there are M register sets, corresponding to columns c=0 through M−1. FIG. 12 is a diagram that shows an example of register sets that correspond to the two-dimensional template 903. Each register set includes three registers, including a first register S0, a second register S1, and a third register S3, which are defined as:

S0[c, 0], S0[c, 1],
S1[c, 0], S1[c, 1],
S2[c, 0].

As shown in FIG. 12, register S0 includes values for the same column as the position being coded B[i], register S1 includes values one column to the right of the position being coded, and register S2 includes a single value located two columns to the right of the position being coded. In some implementations, S0, S1, and S2 may be organized into three arrays, where each register in the first array (for S0) has size 2, each register in the second array (for S1) has size 2, and each register in the third array (for S2) has size 1.

At the beginning of coding a transform block, the shift registers are defined according to the transform type that was used to determine the transform coefficients for the transform bock, and all of the values in the shift registers are initialized to zero. The value to be coded B[i] is to be coded at scan position i, where B[i] is from {0, 1, 2, 3}. The block position corresponding to the scan position i is denoted by row r_i and column c_i. The value to be coded B[i] is obtained from base information, such as the level maps. The context to derive B[i] is determined by summing the values from the shift registers, which represent the spatial context neighbors of the value B[i] according to the template that corresponds to the transform type.

If the transform type is one in TX_CLASS_HORIZ, the context used to code B[i] is derived from:

S0[r_i, 0]+S0[r_i, 1]+S0[r_i, 2]+S0[r_i, 3]+S1[r_i, 0].

After B[i] is coded, the shift registers are updated as follows:

S0[r_i, 0]=B[i],
S0[r_i, 1]=S0[r, 0],
S0[r_i, 2]=S0[r_i, 1],
S0[r_i, 3]=S0[r_i, 2],
S1[r_i, 0]=B[iS[r_i+1, c_i−1]].

To summarize the foregoing, the values in the shift register are updated to assume the values of their immediate neighbors, which in this case are values of the positions to the immediate left of the locations represented by each of the values in the shift registers. For shift register S0, the first value in the shift register, S0[r_1, 0] is updated to the value of the position that was just coded B[i]. The remaining values in shift register S0 assume the values from the preceding value in the register (i.e. values in the register are shifted by one position). For shift register S1, the sole value in the shift register is updated using base information obtained from the level maps, namely the value to be coded for the cell located one row below and one column to the left of the position of the value B[i] of was just coded, which is represented as B[iS[r_i+1, c_i−1]]. After updating, this set of shift registers is ready for use in coding the next value in the same row (i.e., the value in the position directly to the left of B[i]).

If the transform type is one in TX_CLASS_VERT, the context used to code B[i] is derived from S0[c_i, 0]+S0[c_i, 1]+S0[c_i, 2]+S0[c_i, 3]+S1[c_i, 0].

After B[i] is coded, the shift registers are updated as follows:
S0[c_i, 0]=B[i],
S0[c_i, 1]=S0[c_i, 0],
S0[c_i, 2]=S0[c_i, 1],
S0[c_i, 3]=S0[c_i, 2],
S1[c_i, 0]=B[iS[r_i−1, c_i+1]].

To summarize the foregoing, the values in the shift register are updated to assume the values of their immediate neighbors, which in this case are values of the positions immediately above the locations represented by each of the values in the shift registers. For shift register S0, the first value in the shift register, S0[c_i, 0] is updated to the value of the position that was just coded B[i]. The remaining values in shift register S0 assume the values from the preceding value in the register (i.e. values in the register are shifted by one position). For shift register S1, the sole value in the shift register is updated using base information obtained from the level maps, namely the value to be coded for the cell located one row above and one column to the right of the position of the value B[i] of was just coded, which is represented as B[iS[r_i−1, c_i+1]]. After updating, this set of shift registers is ready for use in coding the next value in the same column (i.e., the value in the position directly above B[i]).

If the transform type is one in TX_CLASS_2D, continuing the example in which the transform block has fewer columns M than rows N (i.e., M<N), the context used to code B[i] is derived by:
S0[c_i, 0]+S0[c_i, 1]+S1[c_i, 0]+S1[c_i, 1]+S2[c_i, 0].

After B[i] is coded, the shift registers are updated as follows.
S0[c_i, 0]=B[i],
S0[c_i, 1]=S0[c_i, 0],
S1[c_i, 0]=B[iS[r_i−1, c_i+1]].
S1[c_i, 1]=S1[c_i, 0],
S1[c_i, 0]=B[iS[r_i−1, c_i+2]].

To summarize the foregoing, the values in the shift register are updated to assume the values of their immediate neighbors, which in this case are values of the positions immediately above the locations represented by each of the values in the shift registers. For shift register S0, the first value in the shift register, S0[c_i, 0] is updated to the value of the position that was just coded B[i], and the second value in shift register S0, denoted by S0[c_i, 1], assumes the value from the preceding value in the register (i.e. values in the register are shifted by one position), which in this example is the value of S0[c_i, 0]. For the second shift register S1, the first value in the shift register is updated using base information obtained from the level maps, namely the value to be coded for the cell located one row above and one column to the right of the position of the value B[i] of was just coded, which is represented as B[iS[r_i−1, c_i+1]], and the second value of the second shift register assumes the value from the first value of the second shift register. For the third shift register S2, the sole value in the shift register is updated using base information obtained from the level maps, namely the value to be coded for the cell located one row above and two columns to the right of the position of the value B[i] of was just coded, which is represented as B[iS[r_i−1, c_i+2]]. After updating, this set of shift registers is ready for use in coding the next value in the same column (i.e., the value in the position directly above B[i]). In an example in which there are fewer rows than columns, the register sets can instead be defined on a per-row basis, with each register set being used to provide context for coding values in a single row.

In the implementations described above with respect to FIGS. 10-12, a first group of shift register values is updated using only information obtained from the shift registers, and a second group of shift register values is updated using base information obtained from, for example, the level maps. This implementation reduces reliance on base information, which can increase efficiency and avoid performance issues such as memory bottlenecks while accurately modelling the context for each value being coded.

Figure 13:
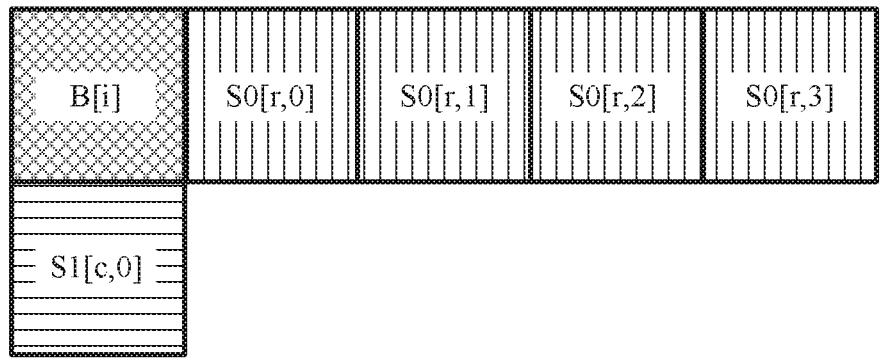
FIG. 13 is a diagram that shows a second example of a register set that corresponds to a horizontal template.
Figure 14:
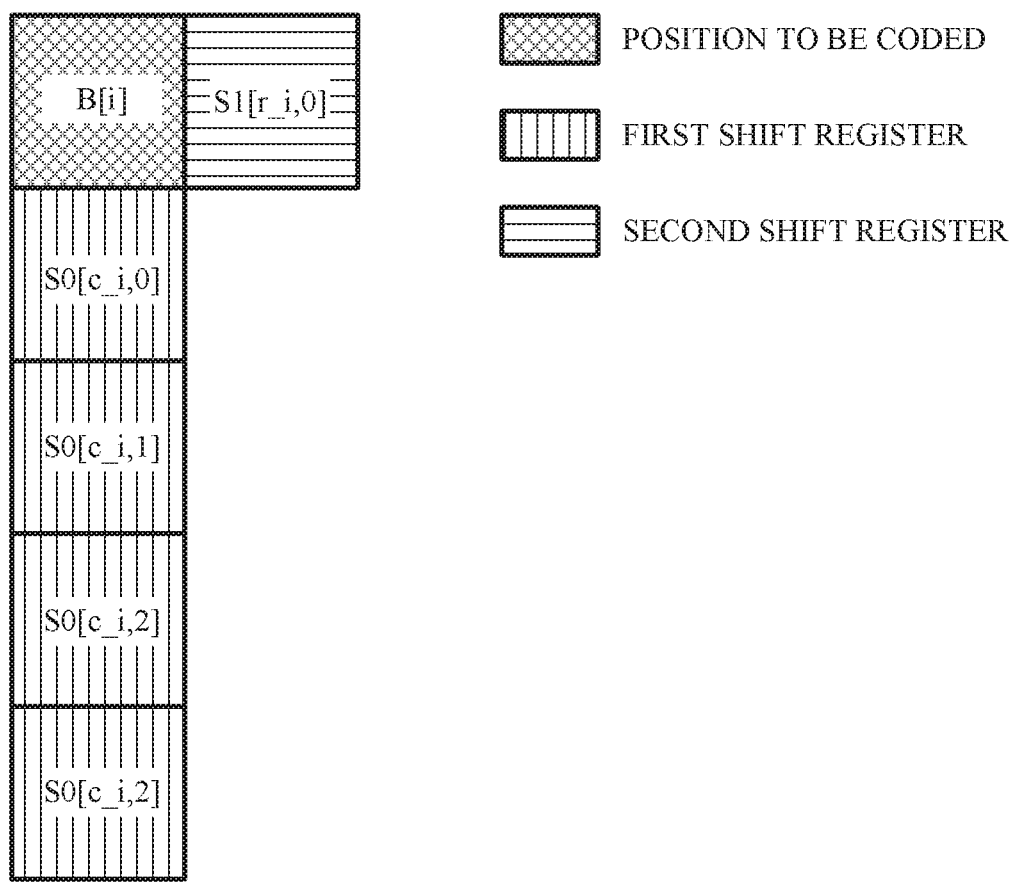
FIG. 14 is a diagram that shows a second example of a register set that corresponds to a vertical template.
Figure 15:
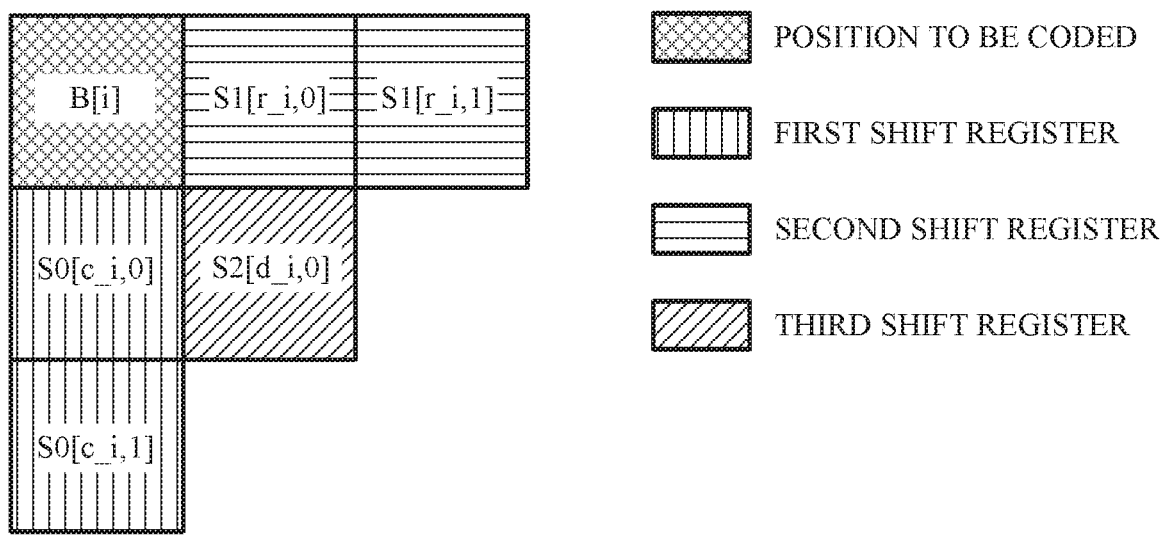
FIG. 15 is a diagram that shows a second example of a register set that corresponds to a two-dimensional template.

A second example in which information needed for context derivation is stored sets of shift registers is shown in FIGS. 13-15. FIG. 13 is a diagram that shows a second example of a register sets that corresponds to a horizontal template. FIG. 14 is a diagram that shows a second example of a register set that corresponds to a vertical template. FIG. 15 is a diagram that shows a second example of a register set that corresponds to a two-dimensional template. This implementation avoids accessing previously coded base information, other than the value being coded B[i], to update shift registers after B[i] is coded. Instead the values that are not obtained by shifting of other values through the shift registers are based on B[i] This implementation may be preferable in cases where accessing the base information is costly.

For a transform of size M×N in TX_CLASS_HORIZ, one 8-bit register is defined to hold four 2-bit values for each row and one 2-bit register is defined to hold one 2-bit value for each column to hold values that correspond spatially to the horizontal template 901, with the values to the right of the value being coded stored on a per-row basis, and the value below the value being coded stored on a per-column basis. For a transform of size M×N in TX_CLASS_VERT, one 8-bit register is defined to hold four 2-bit values for each column and one 2-bit register is defined to hold one 2-bit value for each row, with these registers holding values that correspond spatially to the vertical template 902, with the values below the value being coded stored on a per-column basis, and the value to the right of the value being coded stored on a per-row basis. For a transform of size M×N in TX_CLASS_2D, one 4-bit register is defined to hold two 2-bit values for each row, one 4-bit register is defined to hold two 2-bit values for each column, and one 2-bit register is defined to hold one 2-bit value for each diagonal to hold values that correspond spatially to the two-dimensional template 903, with the values to the right of the value being coded stored on a per-row basis, the values below the value being coded stored on a per-column basis, and the value diagonally below and to the right of the value being coded stored on a per-diagonal basis. The foregoing examples utilize registers that have 2 bits of precision for each value. It should be understood, however, that values of differing precisions could be utilized. It should further be understood that the number of values held in each register can be changed according to the geometry of a particular spatial template.

For coding a transform block of size M×N determined using TX_CLASS_HORIZ using a context corresponding to the horizontal template 901, a first register S0 is defined for each row (i.e., for r=0, 1, . . . , N−1), and a second register S1 is defined for each column (i.e., for c=0, 1, . . . , M−1). The first register S0 and the second register S1 are defined as:
S0[r, 0], S0[r, 1], S0[r, 2], S0[r, 3] for r=0, 1, . . . , N−1,
S1[c, 0] for c=0, 1, . . . , M−1.

As shown in FIG. 13, register S0 includes values for the same row and to the right of the position being coded B[i], and register S1 includes a single value in the same column and one row below the position being coded B[i].

For coding a transform block of size M×N determined using TX_CLASS_VERT using a context corresponding to the vertical template 902, a first register S0 is defined for each column (i.e., for c=0, 1, . . . , M−1), and a second register S1 is defined for each row (i.e., for r=0, 1, . . . , N−1). The first register S0 and the second register S1 are defined as:
  S0[c, 0], S0[c, 1], S0[c, 2], S0[c, 3] for c=0, 1, . . . , M−1
  S1[r, 0] for r=0, 1, . . . , N−1
As shown in FIG. 14, register S0 includes values for the same column and below the position being coded B[i], and register S1 includes a single value in the same row and one column to the right of the position being coded B[i].

For coding a transform block of size M×N determined using TX_CLASS_2D using a context corresponding to the two-dimensional template 903, a first register S0 is defined for each column (i.e., for c=0, 1, . . . , M−1), a second register S1 is defined for each row (i.e., for r=0, 1, . . . , N−1), and a third register S2 is defined for each diagonal. The first register S0, the second register S1, and the third register s2 are defined as:
  S0[c, 0], S0[c, 1] for c=0, 1, . . . , M−1
  S1[r, 0], S1[r, 1] for r=0, 1, . . . , N−1
  S2[d, 0] for d=0, 1, M+N−2.
In the foregoing definition of the third register S2, d is the index of the diagonal line, and can be determined based on the row index [r] and the column index [c] as follows:
  d=0 if (r==c)
    2*abs(r−c)+(r<c) if (r !=c)
Note that any bijective mapping of (r-c) to {0, 1, . . . , M+N−2} can be used to define d above. In cases where negative indices are allowed, r-c or c-r can be used directly as definition of d. As shown in FIG. 15, the first register S0 includes values for the same column and below the position being coded B[i], the second register S1 includes values for the same row and to the right of the position being coded B[i], and the third register S2 includes a single value diagonally below and to the right of the position being coded B[i].

At the beginning of coding a transform block, the shift registers are defined according to the transform type that was used to determine the transform coefficients for the transform bock, and all of the values in the shift registers are initialized to zero. The value to be coded B[i] is to be coded at scan position i, where B[i] is from {0, 1, 2, 3}. The block position corresponding to the scan position i is denoted by row $r\_i$ and column $c\_i$. The value to be coded B[i] is obtained from base information, such as the level maps. The context to derive B[i] is determined by summing the values from the shift registers, which represent the spatial context neighbors of the value B[i] according to the template that corresponds to the transform type.

If the transform type is one in TX_CLASS_HORIZ, the context used to code B[i] is derived from:
  S0[r_i, 0]+S0[r_i, 1]+S0[r_i, 2]+S0[r_i, 3]+S1[c_i, 0].
After B[i] is coded, the shift registers are updated as follows:
  S0[r_i, 0]=B[i],
  S0[r_i, 1]=S0[r_i, 0],
  S0[r_i, 2]=S0[r_i, 1],
  S0[r_i, 3]=S0[r_i, 2],
  S1[c_i, 0]=B[i].
For shift register S0, the first value in the shift register, S0[r_1, 0] is updated to the value of the position that was just coded B[i]. The remaining values in shift register S0 assume the values from the preceding value in the register (i.e. values in the register are shifted by one position). For shift register S1, the sole value in the shift register is updated to the value of the position that was just coded B[i].

If the transform type is one in TX_CLASS_VERT, the context used to code B[i] is derived from:
  S0[c_i, 0]+S0[c_i, 1]+S0[c_i, 2]+S0[c_i, 3]+S1[r_i, 0].
After B[i] is coded, the shift registers are updated as follows.
  S0[c_i, 0]=B[i],
  S0[c_i, 1]=S0[c_i, 0],
  S0[c_i, 2]=S0[c_i, 1],
  S0[c_i, 3]=S0[c_i, 2],
  S1[r_i, 0]=B[i].
For shift register S0, the first value in the shift register, S0[c_i, 0] is updated to the value of the position that was just coded B[i]. The remaining values in shift register S0 assume the values from the preceding value in the register (i.e. values in the register are shifted by one position). In other words, S0 is updated in a first-in-first-out (FIFO) manner by shifting out the oldest value and adding B[i] as the newest entry. For shift register S1, the sole value in the shift register is updated to the value of the position that was just coded B[i].

If the transform type is one in TX_CLASS_2D, the context used to code B[i] is derived from:
  S0[c_i, 0]+S0[c_i, 1]+S1[r_i, 0]+S1[r_i, 1]+S2[d_i, 0].
After B[i] is coded, the shift registers are updated as follows.
  S0[c_i, 0]=B[i],
  S0[c_i, 1]=S0[c_i, 0],
  S1[r_i, 0]=B[i],
  S1[0, 1]=S1[0, 0],
  S2[d_i, 0]=B[i], where
  d_i=0 if (r_i==c_i)
    2*abs(r_i−c_i)+(r_i<c_i) if (r_i !=c_i)
For the first shift register S0, the first value in the shift register, S0[c_i, 0] is updated to the value of the position that was just coded B[i], and the second value in the shift register, S0[c_i, 1] is updated to the prior value of the first value in the shift register (i.e., the value is shifted). For the second shift register S1, the first value in the shift register, S1[r_i, 0] is updated to the value of the position that was just coded B[i], and the second value in the shift register, S1[r_i, 1] is updated to the prior value of the first value in the shift register (i.e., the value is shifted). For shift register S2, the sole value in the shift register is updated to the value of the position that was just coded B[i].

Figure 16:
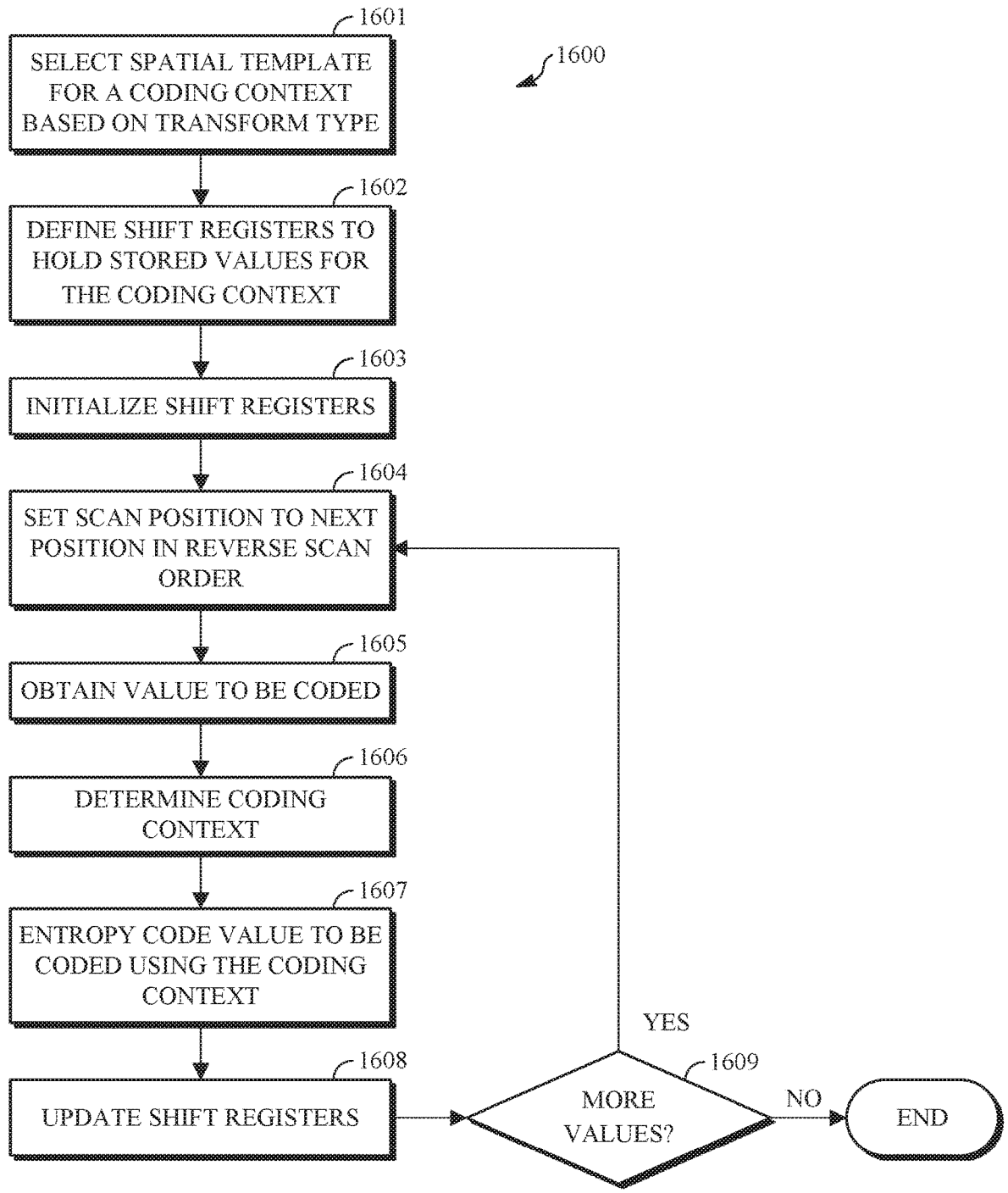
FIG. 16 is a flowchart diagram of a process for coding a transform block according to an implementation of this disclosure.

FIG. 16 is a flowchart diagram of a process for coding a transform block according to an implementation of this disclosure. The process 1600 can be implemented in an encoder such as the encoder 400. In one implementation, the process 1600 is utilized in the process 800, for example, to implement coding of the value B[i] in operation 802.

The process 1600 can be implemented, for example, as a software program that can be executed by computing devices such as transmitting station 102. The software program can include machine-readable instructions that can be stored in a memory such as the memory 204 or the secondary storage 214, and that can be executed by a processor, such as CPU 202, to cause the computing device to perform the process 1600. In at least some implementations, the process 1600 can be performed in whole or in part by the entropy encoding stage 408 of the encoder 400.

The process 1600 can be implemented using specialized hardware or firmware. Some computing devices can have multiple memories, multiple processors, or both. The steps or operations of the process 1600 can be distributed using different processors, memories, or both. Use of the terms "processor" or "memory" in the singular encompasses computing devices that have one processor or one memory as well as devices that have multiple processors or multiple memories that can be used in the performance of some or all of the recited steps.

The process 1600 can receive information that describes the magnitudes of transform coefficients. For example, the process 1600 can receive a transform block, such as the transform block 704, or level maps that represent values from the transform block 704, such as the non-zero map 708, the level-1 map 712, and the level-2 map 714.

In operation 1601, a spatial template for a coding context is selected. This selection can be made based on the transform type that was used to determine the quantized transform coefficients in the transform block that is being coded. The spatial templates are spatial arrangements of cells, anchored at the value being coded at the current scan position, from which the coding context is determined. The templates may be horizontal, vertical, or two-dimensional templates, selected on the basis of use of a one-dimensional horizontal transform type, such as one from TX_CLASS_HORIZ, a one-dimensional vertical transform type, such as one from TX_CLASS_VERT, or a two-dimensional transform type, such as one from TX_CLASS_2D, respectively. Thus, each of a plurality of differently transform types may correspond to selection of a different spatial template. Examples of spatial templates that can be selected in operation 1601 include the horizontal template 901, the vertical template 902, and the two-dimensional template 903.

In some implementations, the spatial template for the coding context corresponds to an area that includes positions from at least two rows and positions from at least two columns, and a top-left position of the spatial template corresponds to the scan position. In some implementations, the transform type is one of a horizontal transform type, a vertical transform type, or a two-dimensional transform type.

In some implementations, the spatial template selected in operation 1601 includes plural values from a same row as the scan position and a single value from a same column as the scan position when the transform type is the horizontal transform type. In some implementations, the spatial template selected in operation 1601 includes plural values from a same column as the scan position and a single value from a same row as the scan position when the transform type is the vertical transform type. In some implementations, the spatial template selected in operation 1601 includes plural values from a same column as the scan position, plural values from a same row as the scan position, and a single value from a same diagonal as the scan position when the transform type is the two-dimensional transform type.

In operation 1602 shift registers are defined to hold values for the coding context. The values held in the shift registers may be referred to herein as stored values. The shift registers are defined based on the geometry of the spatial template selected in operation 1601, such that the values in the shift registers correspond each correspond to a position in the spatial template selected in operation 1601. By defining the shift registers to correspond to a geometric arrangement of the spatial template, the stored values from the shift registers will each correspond to a respective position from the spatial template, and a particular value in each shift register will therefore correspond to a particular spatial location within the spatial template. The values for the spatial template are stored in two or more shift registers, which each can hold values for a single row, column, or diagonal of the spatial template. In some implementations, groups of shift registers are defined that each are used for coding a particular row or column of the transform block. In some implementations, the shift registers each correspond to a column index, a row index, or a diagonal index of the transform block. The shift registers can be defined, for example, as described with reference to the examples shown in FIGS. 10-15.

In operation 1603, the shift registers are initialized. Initializing the shift registers can include setting all of the values in the shift registers to a default value, such as zero.

In operation 1604, entropy coding of values indicative of magnitudes of the transform coefficients from the transform block begins by setting the scan position to a next position to be coded. Coding is performed using a reverse scan order. Therefore, the first position to be coded corresponds to the first non-zero value that appears in the reverse scan order. In subsequent iterations, the scan position is decremented in operation 1604, such that operations 1605-1608 are performed again, which continues until all of the values from the transform block are coded.

In operation 1605, the value to be coded B[i] is obtained from the transform block 704 and/or from level maps that represented the transform block.

In operation 1606, the coding context is determined using the values from the shift registers. As an example, the coding context may be determined by summing the values from the shift registers, as described with references to the examples in FIGS. 10-15.

In some implementations, in operation 1606, determining the coding context using the stored values from the shift registers includes selecting one or more of the shift registers that correspond to one of the column index, the row index, or the diagonal index for the scan position.

Operation 1607 includes entropy coding the value to be coded B[i] using the coding context that was determined in operation 1606. In particular, the coding context is used to select a statistical model for use in entropy coding, which is then performed, for example, as described with respect to the entropy encoding stage 408 of the encoder 400.

Subsequent to entropy coding the value to be coded in operation 1607, at least some of the stored values in the shift registers are updated in operation 1608. In some implementations, updating at least some of the stored values in the shift registers includes shifting one or more values by one position. In some implementations, updating at least some of the stored values in the shift registers includes setting one or more values in the shift registers equal to the value that was coded in operation 1607. In some implementations, updating at least some of the stored values in the shift registers includes obtaining information from the values indicative of the magnitudes of the transform coefficients from the transform block. These values may be the transform coefficient values themselves, absolute values of the transform coefficients, and/or values from level maps. The values may be numbers or may be expressions, such as Boolean expressions. For example, the values may indicate whether the absolute value of each transform coefficient is equal to zero, equal to one, equal to two, or is greater than or equal to three.

In operation 1609, a determination is made as to whether more values remain to be coded. For example, if the most recent operation of 1607 coded scan position i=0, it can be determined that no more values remain to be coded, and the process 1600 ends. Otherwise, the process returns to operation 1604, where the scan position is set to the next position in the reverse scan order, and operations 1605 through 1609 are performed again for the new scan position.

The aspects of encoding and decoding described above illustrate some encoding and decoding techniques. However, it is to be understood that encoding and decoding, as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 102 and/or receiving station 106 (and the algorithms, methods, instructions, etc., stored thereon and/or executed thereby, including by encoder 400 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 102 and receiving station 106 do not necessarily have to be implemented in the same manner.

Further, in one aspect, for example, transmitting station 102 or receiving station 106 can be implemented using a general purpose computer or general purpose processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

Transmitting station 102 and receiving station 106 can, for example, be implemented on computers in a video conferencing system. Alternatively, transmitting station 102 can be implemented on a server and receiving station 106 can be implemented on a device separate from the server, such as a hand-held communications device. In this instance, transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 102. Other transmitting station 102 and receiving station 106 implementation schemes are available. For example, receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method of coding a transform block having transform coefficients, comprising:
    selecting, for the transform block, a spatial template for a coding context;
    defining shift registers to each hold one or more stored values regarding the coding context;
    initializing the shift registers by setting the stored values to default values; and
    coding values indicative of magnitudes of the transform coefficients from the transform block in a reverse scan order including, for each of one or more values:
        obtaining a value to be coded at a scan position,
        determining the coding context using the stored values from the shift registers,
        entropy coding the value to be coded using the coding context, and
        subsequent to entropy coding the value to be coded, updating at least some of the stored values in the shift registers, wherein the shift registers are defined to correspond to a geometric arrangement of the spatial template, such that the stored values from the shift registers each correspond to a respective position from the spatial template.

2. The method of claim 1, wherein the shift registers include at least a first shift register that has a first size and a second shift register that has a second size that is different than the first size.

3. The method of claim 1, wherein the shift registers each correspond to a column index, a row index, or a diagonal index of the transform block.

4. The method of claim 3, wherein determining the coding context using the stored values from the shift registers includes selecting one or more of the shift registers that correspond to one of the column index, the row index, or the diagonal index for the scan position.

5. The method of claim 1, wherein updating at least some of the stored values in the shift registers includes shifting one or more values by one position.

6. The method of claim 1, wherein updating at least some of the stored values in the shift registers includes setting one or more values in the shift registers equal to the value to be coded.

7. The method of claim 1, wherein updating at least some of the stored values in the shift registers includes obtaining information from the values indicative of the magnitudes of the transform coefficients from the transform block.

8. The method of claim 1, wherein the spatial template for the coding context corresponds to an area that includes positions from at least two rows and positions from at least two columns, and a top-left position of the spatial template corresponds to the scan position.

9. The method of claim 1, wherein the transform type is one of a horizontal transform type, a vertical transform type, or a two-dimensional transform type, the spatial template includes plural values from a same row as the scan position and a single value from a same column as the scan position when the transform type is the horizontal transform type, and the spatial template includes plural values from a same column as the scan position and a single value from a same row as the scan position when the transform type is the vertical transform type, and the spatial template includes plural values from a same column as the scan position, plural values from a same row as the scan position, and a single value from a same diagonal as the scan position when the transform type is the two-dimensional transform type.

10. An apparatus for coding a transform block having transform coefficients, comprising:
a processor configured to:
select, for the transform block, a spatial template for a coding context;
define shift registers to each hold one or more stored values regarding the coding context;
initialize the shift registers by setting the stored values to default values; and
code values indicative of magnitudes of the transform coefficients from the transform block in a reverse scan order by, for each of one or more values:
obtaining a value to be coded at a scan position,
determining the coding context using the stored values from the shift registers,
entropy coding the value to be coded using the coding context, and
subsequent to entropy coding the value to be coded, updating at least some of the stored values in the shift registers, wherein the shift registers are defined to correspond to a geometric arrangement of the spatial template, such that the stored values from the shift registers each correspond to a respective position from the spatial template.

11. The apparatus of claim 10, wherein the shift registers include at least a first shift register that has a first size and a second shift register that has a second size that is smaller than the first size.

12. The apparatus of claim 10, wherein the shift registers each correspond to a column index, a row index, or a diagonal index of the transform block, and the processor is further configured to determine the coding context using the stored values from the shift registers includes selecting one or more of the shift registers that correspond to one of the column index, the row index, or the diagonal index for the scan position.

13. The apparatus of claim 10, wherein the processor is configured to update at least some of the stored values in the shift registers by shifting one or more values by one position, and to update at least some of the stored values in the shift registers by setting one or more values in the shift registers equal to the value to be coded.

14. The apparatus of claim 10, wherein the processor is configured to update at least some of the stored values in the shift registers by obtaining information from the values indicative of the magnitudes of the transform coefficients from the transform block.

15. The apparatus of claim 10, wherein the spatial template for the coding context corresponds to an area that includes positions from at least two rows and positions from at least two columns, and a top-left position of the spatial template corresponds to the scan position.

16. A non-transitory computer-readable storage device including program instructions executable by one or more processors that, when executed, cause the one or more processors to perform operations for coding a transform block having transform coefficients, the operations comprising:
selecting, based on a transform type used for the transform block, a spatial template for a coding context;
defining shift registers to each hold one or more stored values regarding the coding context;
initializing the shift registers by setting the stored values to default values; and
coding values indicative of magnitudes of the transform coefficients from the transform block in a reverse scan order including, for each of one or more values:
obtaining a value to be coded at a scan position,
determining the coding context using the stored values from the shift registers,
entropy coding the value to be coded using the coding context, and
subsequent to entropy coding the value to be coded, updating at least some of the stored values in the shift registers, wherein the shift registers are defined to correspond to a geometric arrangement of the spatial template, such that the stored values from the shift registers each correspond to a respective position from the spatial template.

17. The non-transitory computer-readable storage device of claim 16, wherein the shift registers each correspond to a column index, a row index, or a diagonal index of the transform block, and determining the coding context using the stored values from the shift registers includes selecting one or more of the shift registers that correspond to one of the column index, the row index, or the diagonal index for the scan position.

18. The non-transitory computer-readable storage device of claim 16, wherein updating at least some of the stored values in the shift registers includes shifting one or more values by one position, and updating at least some of the stored values in the shift registers includes setting one or more values in the shift registers equal to the value to be coded.

19. The method of claim 1, wherein selecting the spatial template comprises selecting the spatial template based on a transform type used for the transform block.

20. The apparatus of claim 10, wherein the processor is configured to select the spatial template based on a transform type used for the transform block.

* * * * *